US011430000B1

(12) United States Patent
Depaolo et al.

(10) Patent No.: US 11,430,000 B1
(45) Date of Patent: Aug. 30, 2022

(54) ONLINE SYSTEM WITH BROWSER EXECUTABLE

(71) Applicant: MASSACHUSETTS MUTUAL LIFE INSURANCE COMPANY, Springfield, MA (US)

(72) Inventors: Damon Ryan Depaolo, Barkhamsted, CT (US); Payton A. Shubrick, Springfield, MA (US); Robert Benoit, West Springfield, MA (US)

(73) Assignee: MASSACHUSETTS MUTUAL LIFE INSURANCE COMPANY, Springfield, MA (US)

( * ) Notice: Subject to any disclaimer, the term of this patent is extended or adjusted under 35 U.S.C. 154(b) by 413 days.

(21) Appl. No.: 15/896,926

(22) Filed: Feb. 14, 2018

Related U.S. Application Data

(60) Provisional application No. 62/459,480, filed on Feb. 15, 2017.

(51) Int. Cl.
*G06Q 30/02* (2012.01)
*G06Q 30/06* (2012.01)
*H04L 67/50* (2022.01)
*G06F 16/955* (2019.01)
*G06F 40/221* (2020.01)

(52) U.S. Cl.
CPC ....... *G06Q 30/0239* (2013.01); *G06F 16/955* (2019.01); *G06F 40/221* (2020.01); *G06Q 30/0601* (2013.01); *H04L 67/22* (2013.01)

(58) Field of Classification Search
USPC .............................................. 705/27.1, 14.1
See application file for complete search history.

(56) References Cited

U.S. PATENT DOCUMENTS

| | | | | |
|---|---|---|---|---|
| 8,612,288 | B2 * | 12/2013 | King | G06Q 30/02 705/14.23 |
| 2002/0062249 | A1 * | 5/2002 | Iannacci | G06Q 30/06 705/14.1 |
| 2009/0076949 | A1 * | 3/2009 | Olliphant | G06Q 40/12 705/39 |
| 2010/0106598 | A1 * | 4/2010 | Grimes | G06Q 30/0269 705/14.53 |
| 2012/0078755 | A1 * | 3/2012 | Subbarao | G06Q 30/0641 705/27.1 |
| 2015/0254704 | A1 * | 9/2015 | Kothe | G06Q 30/0225 705/14.26 |

(Continued)

OTHER PUBLICATIONS

An Enhanced Framework for Web Recommenders (Year: 2009).*

(Continued)

*Primary Examiner* — Gautam Ubale
(74) *Attorney, Agent, or Firm* — Foley & Lardner LLP

(57) ABSTRACT

Systems for assisting users in selecting various promotional offers while shopping online are disclosed. The system is configured to receive promotional information being offered by one or more business merchants to a user, determine a navigation to a webpage on a user device by the user from where an item can be purchased, identify one or more attributes associated to the webpage, determine one or more promotions from the promotional information based on the one or more attributes identified, and display on the user device of the user the one or more promotions associated with the item being purchased by the user on the webpage of the user device.

18 Claims, 4 Drawing Sheets

(56) References Cited

U.S. PATENT DOCUMENTS

| | | | | |
|---|---|---|---|---|
| 2015/0269606 | A1* | 9/2015 | Hewett | G06Q 30/0243 |
| | | | | 705/14.42 |
| 2017/0046727 | A1* | 2/2017 | Chau | G06Q 30/0631 |
| 2018/0174220 | A1* | 6/2018 | Jadhav | G06F 16/95 |

OTHER PUBLICATIONS

Best Offer Recommendation Service (Year: 2016).*
"Honey automatically applies the best coupon code at checkout", Automatic Coupons, Promo Codes, and Deals /Honey, https://www.joinhoney.com/, retrieved from the website on May 9, 2018, 6 pages.

* cited by examiner

ONLINE SYSTEM WITH BROWSER EXECUTABLE

CROSS-REFERENCE TO RELATED APPLICATIONS

This application claims priority from U.S. Provisional Patent Application Ser. No. 62/459,480, filed Feb. 15, 2017, which is hereby incorporated by reference in its entirety.

TECHNICAL FIELD

The present disclosure in general relates to online web activity, and in particular relates to methods and systems for determining promotional offers having a benefit value offered to a user based upon the online web activity of the user.

BACKGROUND

The World Wide Web has allowed thousands of merchants to offer products for sale via the Internet through stores presented to consumers as websites and other electronically connected purchase environments. Many of these online merchant stores, also known as electronic commerce platforms or ecommerce sites, may offer discounts to consumers who enter a specific code while shopping. These codes may be referred to as coupon codes, discount codes, or promotion codes. These codes may offer free or discounted shipping or a lower price on an entire basket of products, a category of products, a specific product, a certain number of products, products over a certain value, or even a combination of products.

In addition, various other service providers such as banks, memberships, companies, and other organizations regularly introduce various attractive offers to lure the users to shop online. For example, a bank may offer a certain amount of cash back on a purchase from a particular store using their bank credit or debit card. In another example of a promotion, a store may offer reward points when a user purchases a product using a specific bank card. Many companies also have memberships with several merchants that allow their employees to receive a particular discount. These companies may host a loyalty program that extends similar promotional offers across a variety of merchants.

Although the users may have multiple promotion benefits available, the users are not able to completely benefit from the promotions and offers available online. In some instances, the discount codes on purchases of products and services are advertised to consumers during the online shopping experience, but frequently, the discount codes are hidden from most consumers and may only be exposed to them through other channels, such as emails and messages. Likewise, users of loyalty programs may benefit only if they remember receiving such promotional offers. As a result, users may not remember these offers and promotion codes when they are looking to buy something or when they are actually conducting a transaction at a merchant site. Moreover, even if the user may recall a particular discount code, the user may not remember an additional promotional offer that may be applicable to the current transaction and may be more financially favorable (e.g., larger discount). Conventional web browsers do not provide a solution to these issues.

SUMMARY

For the aforementioned reasons, it is desirable for a method and a system for specifying various promotional offers available to users while the users are shopping online. The systems and methods disclosed herein attempt to address the above-mentioned shortcomings in the art and provide a variety of other benefits.

In one embodiment, a computer-implemented method may include, for every webpage accessed on a browser of a user device, querying, by a server via a software module executing on the browser, a database using a uniform resource locator of a first webpage accessed on the browser to retrieve a pre-determined list of webpages, the pre-determined list of webpages comprising uniform resource locators of one or more webpages associated with one or more pre-determined entities while the browser is displaying each webpage. The computer-implemented method may further include, when the pre-determined list of webpages in the database comprises the uniform resource locator of the first webpage, parsing, by the server, content of the first webpage to identify a string of characters displayed on the first webpage indicating a transaction on the first webpage. The computer-implemented method may further include querying, by the server, the database to retrieve a pre-determined list of string of characters. The computer-implemented method may further include, when the pre-determined list of string of characters in the database comprises at least one identified string of characters on the first webpage, querying, by the server, the database to retrieve a user profile of a user operating the user device, the user profile comprising one or more user membership attributes. The computer-implemented method may further include querying, by the server, the database for a plurality of promotional offers associated with the one or more user membership attributes and the uniform resource locator of the first webpage. The computer-implemented method may further include displaying, by the server via the software module executing on the browser, a graphical component comprising a ranking order of the plurality of promotional offers based on a benefit value offered to the user, the graphical component overlaying the first webpage. The computer-implemented method may further include receiving, by the server in response to interaction of the user with the graphical component, a selection of one promotional offer from the plurality of promotional offers. The computer-implemented method may further include querying, by the server, the database to retrieve a code associated with the one promotional offer, the code comprising a text string of one or more alphanumerical values. The computer-implemented method may further include populating, by the server, a first input field on the first webpage with the code, the first input field corresponding to a text field to input the promotional offer.

In another embodiment, a system may include a user device comprising a browser. The browser may include software module, and be in connection to a server. The server is configured to, for every webpage accessed on a browser of a user device, query a database using a uniform resource locator of a first webpage accessed on the browser to retrieve a pre-determined list of webpages, the pre-determined list of webpages comprising uniform resource locators of one or more webpages associated with one or more pre-determined entities while the browser is displaying each webpage. The server is configured to, when the pre-determined list of webpages in the database comprises the uniform resource locator of the first webpage, parse content of the first webpage to identify a string of characters displayed on the first webpage indicating a transaction on the first webpage. The server is configured to query the database to retrieve a pre-determined list of string of characters. The server is configured to, when the pre-determined list of string of characters in the database comprises at least one identified string of characters on the first webpage, query the database to retrieve a user profile of a user operating the user device, the user profile comprising one or more user membership attributes. The server is configured to query the database for a plurality of promotional offers associated with the one or more user membership attributes and the uniform resource locator of the first webpage. The server is configured to display a graphical component comprising a ranking order of the plurality of promotional offers based on a benefit value offered to the user, the graphical component overlaying the first webpage. The server is configured to, in response to interaction of the user with the graphical component, receive a selection of one promotional offer from the plurality of promotional offers. The server is configured to query the database to retrieve a code associated with the one promotional offer, the code comprising a text string of one or more alphanumerical values. The server is configured to populate a first input field on the first webpage with the code, the first input field corresponding to a text field to input the promotional offer.

Numerous other aspects, features and benefits of the present disclosure may be made apparent from the following detailed description taken together with the drawing figures.

BRIEF DESCRIPTION OF THE DRAWINGS

Non-limiting embodiments of the present disclosure are described by way of example with reference to the accompanying figures which are schematic and are not intended to be drawn to scale. Unless indicated as representing the background art, the figures represent aspects of the disclosure.

DETAILED DESCRIPTION

Figure 1:
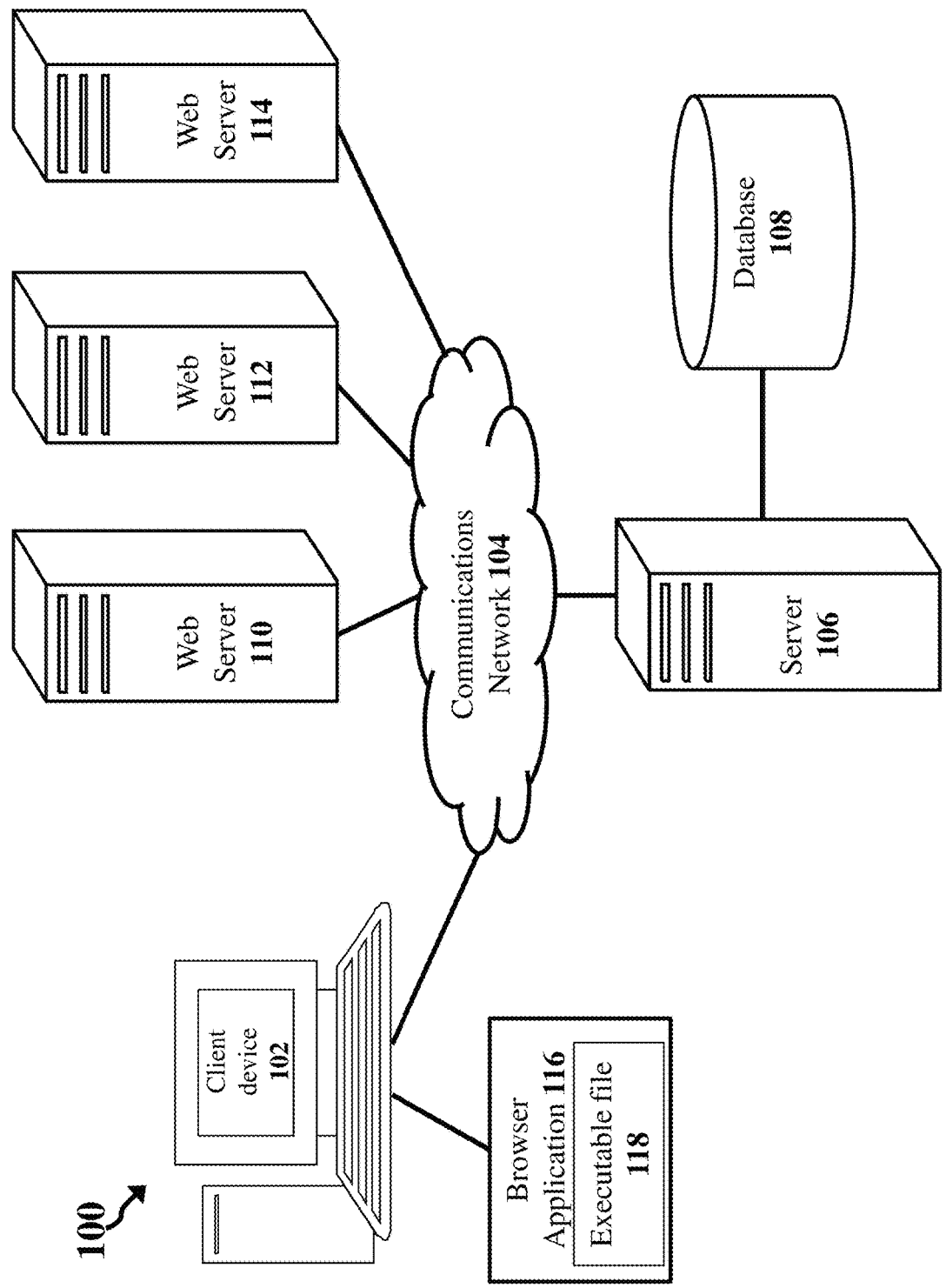
FIG. 1 shows components of an exemplary system for assisting users to select various promotional offers while shopping online, according to an exemplary embodiment.

The present disclosure is here described in detail with reference to embodiments illustrated in the drawings, which form a part thereof. Other embodiments may be used and/or other changes may be made without departing from the spirit or scope of the present disclosure. The illustrative embodiments described in the detailed description are not meant to be limiting of the subject matter presented here.

Reference will now be made to the exemplary embodiments illustrated in the drawings, and specific language will be used here to describe the same. It will nevertheless be understood that no limitation of the scope of the disclosure is thereby intended. Alterations and further modifications of the inventive features illustrated here, and additional applications of the principles of the disclosures as illustrated here, which would occur to one skilled in the relevant art and having possession of this disclosure, are to be considered within the scope of the disclosure.

FIG. 1 shows components of an exemplary system 100 for presenting various promotional offers to an online user, according to an exemplary embodiment. The exemplary system 100 comprises a user device 102 (also known as client device), a communications network 104, a server 106, a database 108, and web servers 110, 112, 114.

The communications network 104 refers to a medium that connects various user devices 102, server 106, and web servers 110, 112, 114 of the system 100. The examples of the communications network 104 include, but are not limited to, private or public LAN, WLAN, MAN, WAN, and the Internet. The communications network 104 can include both wired and wireless communications according to one or more standards and/or via one or more transport mediums. The communication over the communications network 104 may be performed in accordance with various communication protocols such as Transmission Control Protocol and Internet Protocol (TCP/IP), User Datagram Protocol (UDP), and IEEE communication protocols. In one example, the communications network 104 may include wireless communications according to Bluetooth specification sets, or another standard or proprietary wireless communication protocol. The communications network 104 may also include communications over a cellular network, including, e.g. a GSM (Global System for Mobile Communications), CDMA (Code Division Multiple Access), EDGE (Enhanced Data for Global Evolution) network.

The user device 102 may be any portable or non-portable device, such as a desktop computer, laptop computer, tablet computer, smart phone, smart watch, gaming console, personal digital assistant, and the like. The user device is a computer with a processor/microcontroller and/or any other electronic component that performs one or more operations according to one or more programming instructions. The user device 102 may be capable of communicating with the server 106 through the communications network 104 using wired or wireless communication capabilities. Although the user device 102 is depicted as a single computer, the system 100 may comprise a plurality of client computers 102.

The user device 102 may include one or more input/output devices configured to allow user interaction with one or more programs configured to communicate with the server 106 configured to assist users to take a decision with all promotional information available to them while shopping online. In one example, the user device 102 may execute a browser application 116 (also known as a web browser) that accesses and presents a web application executed by the server 106 or another device and allows a user to select one or more items/products sold by an entity and/or a business merchant. Examples of the browser application may include, but are not limited to, Mozilla Firefox®, Microsoft® Internet Explorer, Google® Chrome, and Apple Safari®. The term "online," as used herein, refers to activities that occur over the network 104, including, but not limited to, accessing a merchant's website, social network sites, etc.

In another example, the user device 102 may include computers from which users access and interact with the server 106, which is configured to perform evaluation of all available promotional offers from a particular business merchant and other promotion service organizations available to the user. In yet another example, the user device 102 executes an application outside of a browser application, for example, an operating system-specific application, such as a Windows, Android, or Apple iOS application, that accesses and presents information processed by the server 106 to perform evaluation of all available promotional offers of the user provided from a particular business merchant and other promotion service organizations.

In some embodiments, any data transmitted over the communications network 104, for example, from the user device 102 to the database 108 may be formatted in accordance with a variety of different communications protocols. For example, all or a portion of the network 104 may be a packet-based, Internet Protocol (IP) network that communicates data from the user device 102 to the database 108 in Transmission Control Protocol/Internet Protocol (TCP/IP) packets. In one example, the user browsing history and/or purchasing data at one or more business merchants obtained from the user device 102 may be formatted the server 106 and/or the user device 102 itself, and is then transmitted to the database 108.

The database 108 stores information that may include, but not limited to, one or more promotions and offers for merchants and products, referral URL and tracking codes, duration of applicability of the promotions/offers, terms and conditions associated with the promotions/offers, name of merchants, applicable membership levels, and the descriptive text about the promotions/offers. In some embodiments, the offers/promotions may include, but are not limited to any discounted rate or any other added value for a product/item received by a user, e.g., a discount on a particular good or service that is available to a user because of their affiliation with an enabling organization (e.g., payment card issuer). In another example, the offers may include points, miles, or upgrades (e.g., from economy class to first class air tickets) that may be accrued for redemption in accordance with various commonplace rewards programs available to user.

The server 106 may have various software modules and/or web crawlers to browse various websites/webpages associated with the membership clubs, banks, merchants, loyalty programs, sites, etc., in order to index various offers/promotions of the user and store it in a user profile within a web browser of the user device 102 and/or the database 108. In some embodiments, the server 106 may automatically receive data feeds (offers and promotions) from various merchant entity servers and store the data feeds in the database 108.

The server 106 may receive or query the web servers 112, 114 for promotions or other discount codes and store that information in the database 108. In one example, the web server 112 may be associated with a loyalty program and/or a membership program of a user, whereby the web server 112 hosts data records associated with the user of the user device 102, such that the web server 112 stores various promotional or discount codes that may be utilized by the user device 102 for different merchants or websites. In this example, a user may have a bank payment card that provides discounts at various merchants, but each merchant requires that a different discount code be entered during the "checkout field" of that online transaction. The user is required to visit the web server 112 website to identify the appropriate discount/promotion code for a particular transaction. The system 100 allows the server 106 to query the web server 112 for each of the discount/promotion codes and store these codes in the database 108.

In another example, the web server 114 hosts a program whereby the user receives a discount at a particular merchant entity. The web server 114 has a record that associates the user with this discount. The user accesses the web server 114 via the user device to obtain the discount for use at a website of the particular merchant, such as the merchant website presented by the web server 110. The server 106 obtains the discount code from the web server 114 and stores the discount code in the database 108.

A user and/or administrator of the system 100 manually look through various offers and promotions from the web servers 112, 114 and then sort, prioritize and annotate them in the database 108. In such cases, the database 108 may submit the information related to promotional offers of the user to the server 106 on receiving a request or otherwise, in order to perform evaluation of available promotional offers from a particular business merchant and other promotion service organizations for the user. The promotional offer information may be exclusive information belonging to the user, and is securely transmitted to the user device 102 using a secure data transfer process.

The database 108 may be hosted on one or more computing devices comprising non-transitory machine-readable storage media capable of receiving, storing, updating, and/or querying records of the database 108 containing the information related to promotional offers of the user. The database 108 may be a logical construct of data files that are stored in non-transitory machine-readable storage media, such as a hard disk or computer memory, controlled by software modules of a database program (for example, SQL), and a related database management system (DBMS) that executes the code modules (for example, SQL scripts) for various data queries and other management functions. The database 108 may be hosted on any computing devices comprising storage media capable of storing the information related to promotional offers of the user received from the server 106, and a processor, or in communication with a processor, capable of executing the various commands of the DBMS. The non-limiting examples of the computing hardware that may host the database 108 may include a server computer, a desktop computer, a laptop, or the like.

The server 106 may include one or more modules to identify and perform evaluation of available promotional offers for a user from a particular business merchant entity and other promotion service organizations associated to the user. The server 106 may perform various analytics on promotional offer information records stored in the database 108, and may be further employed to recommend to the user an optimal promotion offer to be applied while shopping at a particular business merchant entity. The server 106 can be any of several different types of network devices. The server 106 may be implemented in hardware, software, or a combination of both and can include one or more functional modules configured to execute various functions attributed to the server 106. Additionally, although example system FIG. 1 includes one server 106, other examples include a number of collocated or distributed servers configured to process user's promotional and other types of discount data associated with the products and other items sold by the business merchant and, stored in the database 108 individually or in cooperation with one another.

Although the database 108 and the server 106 are illustrated as separate components in the system 100 of FIG. 1, in other examples the components are combined or each is distributed amongst more than one device. In one example, the server 106 stores the database 108 and control the database 108 to periodically retrieve user browsing data from the user device 102 over the communications network 104. In another example, the database 108 may be distributed among a number of separate devices, e.g. a number of database servers, and the server 106 includes a number of co-located or distributed servers configured to operate and/ or in cooperation with one another and with the various devices comprising the database 108.

Regardless of the particular configuration of system 100 or other example systems, the system 100 may be employed to perform various analytics on promotional offer information records of the user and present to the user an optimal promotion offer to be applied while conducting transactions at a particular business merchant. In one example, the server 106 retrieves from the user device 102 or the user device 102 pushes data related to user's promotions to the server 106 over the network 104. The user's promotional data is received by the server 106 periodically and stored in the database 108 for different periods of time, for example, in blocks of one or more days, weeks, months, or years. The server 106 then analyzes the user's promotional offers to determine an optimal promotional offer for a product or products that the user is looking to purchase at a webpage of a website.

Web server 110 hosts a webpage that is accessible by the user device 102 over the communication network 104. The web server 110 may be a merchant entity or other entity that generates content for display on a browser application 116 of the user device 102 such that the user device 102 can conduct a transaction (e.g., pay for a product or service or item) offered by the web server 110. In one example, the web server 110 is a web server of a merchant, and the user device 102 uses the browser application 116 to view content from the merchant on the web server 110 to select a product or service for purchase.

During operation, a user device 102 may be used by a user to access the merchant's website and/or social networking site for making an online purchase. When the user performs an activity on a browser of the user device 102, a software module and/or the browser application 116 may track the user web browsing activity. The browser application 116 may track the web browsing activity based on at least one of the browser cookies, the website Uniform Resource Locator (URL), the website, the content of a webpage, and a search query for assisting online shopping. While the example described herein recites the browser application 116 having an executable file 118, it is intended that the systems and methods can be integrated on a different application (e.g., a social networking application) that uses the functionality of a software module (installed on the browser application 116) and/or the executable file 118. In an alternative embodiment, on a mobile device, the functionality of the extension may be executed by a separate application. The executable file 118 may be an extension, plug-in, or add-on.

The browser application 116 of the user device 102 executes the software module and/or the executable file 118. The software module and/or the executable file 118 obtains an identity of the user of the user device 102 and an identification of the webpage being accessed on the browser application 116 of the user device 102. The software module and/or the executable file 118 may obtain the identity of the user of the user device 102 by using a stored profile, cookies, IP address, request for input of an identification, or other identification method. The software module and/or the executable file 118 may obtain the identification of the webpage using a domain, URL, or other identification method.

Upon determining that the browser application 116 has loaded a webpage having a string of characters corresponding to a promotion or discount, the software module and/or the executable file 118 may then query the server 106. The browser application 116 may identify the string of characters by identifying a HTML code of the particular webpage, using web scraping, or recognizing the URL of the webpage as one that presents such a string of characters. The software module and/or the executable file 118 may query the server 106 with a request that contains the identification of the user of the user device 102 and an identification data of the webpage.

The server 106 may receive the request that may include the identification of the user and the webpage, and may obtain a listing of relevant promotion codes, e.g., codes that can be inputted by the user device on an input field of the webpage to apply a discount code where these codes are associated with a user profile, one or more user membership attributes and/or information associated with the webpage. For example, the server 106 may determine that the user has three different promotion codes that can be utilized on a particular webpage being accessed by the user. The server 106 may then transmit the three promotion codes to the software module and/or the executable file 118.

The software module and/or the executable file 118 may receive any available promotion codes and presents the promotion codes in a pop-up window, drop-down menu, or other presentation via the browser. The promotion code may include a text string of one or more alphanumerical values. The available promotion codes may be ranked in order of benefit, e.g., biggest discount or biggest potential savings and displayed on a graphical component, which is overlaying on the browser application 116. In some embodiments, the user of the user device 102 may then enter one of the promotion codes into a text field to input the promotion offer presented on the webpage in the appropriate input field for promotions. In an alternative embodiment, the user may interact with the graphical component to select one of the promotion codes, and the software module and/or the executable file 118 may then populate the appropriate input field on the webpage with the promotion code. In some embodiments, details of the promotion such as available promotion codes and instructions on how to access the promotion codes may be displayed on the browser application 116 and/or the graphical component along with the promotions. In some embodiments, the server 106 may display at least one promotion offer having one or more attributes of the promotion. The one or more attributes include, but not limited to, information indicating specific payment card to be used with respect to the promotion, coupon code etc.

Figure 2:
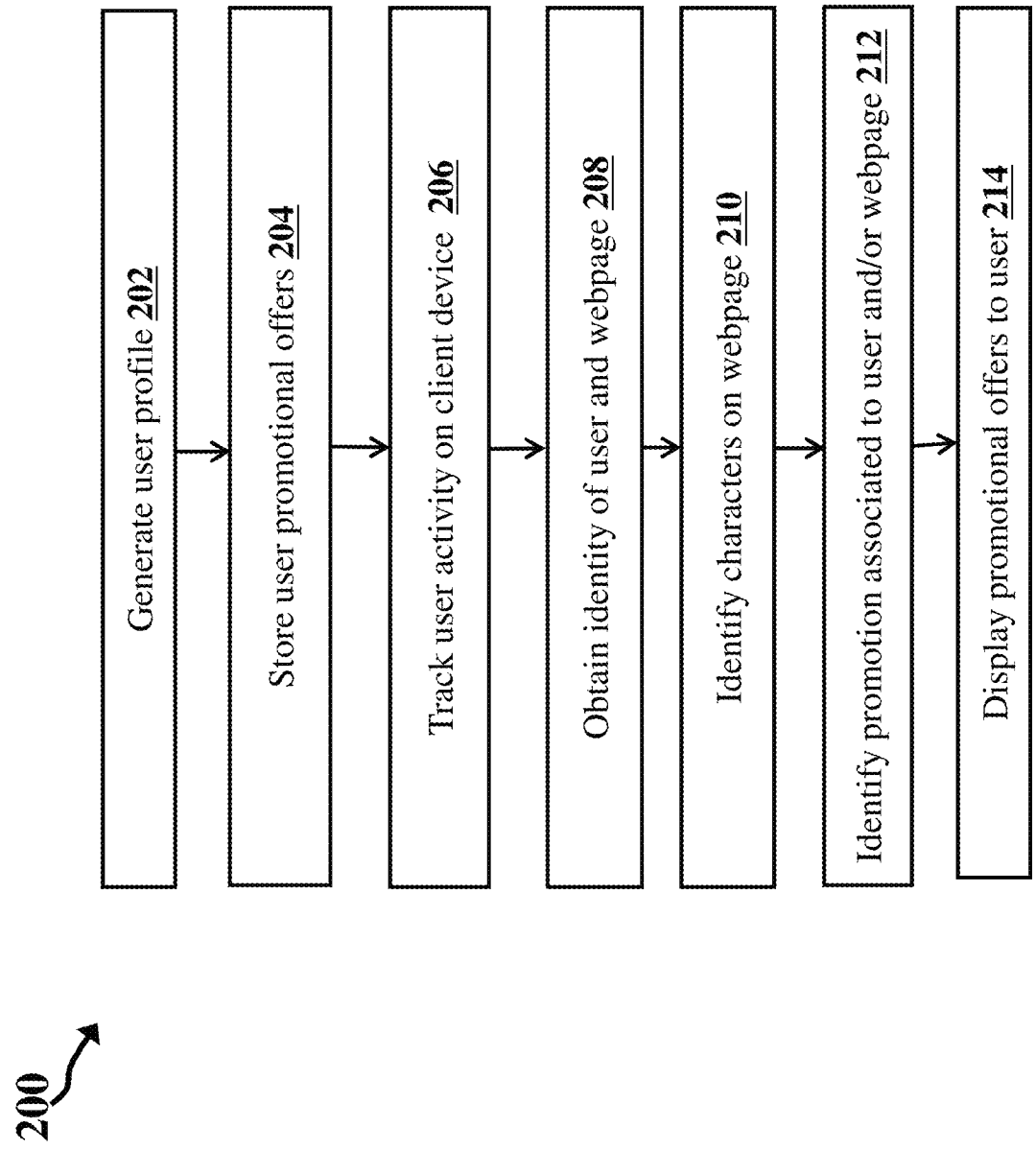
FIG. 2 is a flow diagram of an illustrative process for assisting users to select various promotional offers while shopping online, according to an exemplary embodiment.

FIG. 2 is a flow diagram of an illustrative process 200 for assisting users to select various promotional offers while shopping online, according to an exemplary embodiment.

At step 202, a server may generate a user profile for a user account with the server by collecting data about the user from a registration process. The user profile may include one or more user attributes and one or more user membership attributes. In some embodiments, the user attributes and the user membership attributes may include user attribute data corresponding to, but not limited to, user name, user card details, user address details, user membership details, user company name, and user loyalty membership. The server stores the user profile and associated attributes in a database.

During the registration process, the user may provide login data to access the account. Accordingly, when the user access the account next time, the server may initially display an authentication prompt on the user device. The authentication prompt may include a login field configured to receive the login data from the user. The login field may include one or more fields corresponding to a username, a user password, or any other suitable identification data. The server may then receive the login data inputted by the user on the user device in response to the login field questions. The server then authenticates the user of the user device based on verification of identification data of the user obtained using the login data of the user.

At step 204, a server may generate a record that may include promotional offers and/or promotions associated to the user. The information within the record is stored in the database along with the user profile as attributes of the user profile. In some embodiments, the server interacts with one or more banks and membership companies related to the user to extract details such as promo code, points accrued through a credit card, membership level, jet miles, and cash back available to the user. The details may further include information such as validity date of the promotion, associated business rules on how and when these promotions should be presented, and discounted amount. All above-mentioned information is stored as attributes associated with user profile in the database.

In some embodiments, user device communicates via a network (s) with various entities and/or merchant sites. The communication may take any suitable form. For example, in some embodiments, the user device may execute a browser application having an executable file and/or a software module that enables a user to navigate to the merchant sites. It should be noted that the embodiments of the present disclosure are not limited to use with web sites accessible via a browser application. As such, the merchant sites may each include any site which is accessible via the Internet. For instance, any one or more of merchant sites may not be a website per se, but rather may comprise a mobile version of a site, or another form of site to which a user may navigate online. For example, a user may navigate to one or more of merchant sites by inputting a uniform resource locator (URL) into a browser application, for instance, by clicking on a link, automatically being taken there via an action initiated by another site and/or another application program.

The merchant sites may each make available codes that may be redeemed for value, and/or enable a user to redeem a code for value. For example, the software module and/or the executable file may obtain a code from the merchant site, and the code may be redeemable for value at the merchant site whenever the user shops next time. In such instances, the software module and/or the executable file may transmit such code to the server, and the server stores such codes in a user profile within a database. In another example, the server may obtain a code from the merchant site, and the code may be redeemable for value at the merchant site whenever the user shops next time. The server stores such codes in a user profile as an attribute, and then store the user profile within a database.

In some embodiments, the server stores a code in a database which is automatically identified, for instance, as a user navigates to an online merchant site. The server then stores the code under a user profile within a database. In some embodiments, the server stores the codes partially in the database and partially on the web browser of user device. The database may each be implemented in any of numerous ways. For example, the database on user device may comprise one or more cookies, as are known in the art, local storage, e.g., as defined by an application executing on user device, e.g., a browser application, or defined in some other manner and/or some other forms of storage facility.

The automatic identification of a code may take any of numerous forms. In one example, the software module and/or the executable file installed on the user device may parse and/or scan the webpages of a merchant site to which a user navigates, searching for characteristics which signal the presence of a code. In another example, the server may scan the webpages of a merchant site to which a user navigates, searching for characteristics which signal the presence of a code. Any of numerous types of page characteristics may indicate the presence of a code. For example, the software module and/or the executable file and/or the server may compare a page's content, URL, markup language tags, and/or any other suitable data to information which was previously identified as indicating the presence of a code. For example, the software module and/or the executable file and/or the server may compare the content of a webpage to alphanumeric strings and/or alphanumerical values previously stored in the database to determine whether a code is present on the webpage.

In another example, an automatic identification of a code by the software module and/or the executable file and/or the server may, for example, be based at least in part on the location at which a code is placed on a page. For example, a location of an alphanumeric string at a top right of a page, or a top left of a page. In yet another example, a code may also be automatically identified by the software module and/or the executable file and/or the server based at least in part on language context. For example, if a page includes language such as "Please save this code: XYZ", then the server may determine that the XYZ is a code which may be redeemed for value.

In yet another example, a code may also be automatically identified by the software module and/or the executable file and/or the server based at least in part on page information which identifies certain content as a code that may be redeemed for value. For example, a markup language (e.g., HTML etc.) tag may identify tagged content as a code that may be redeemed for value. In addition, information contained in a page's URL may identify it as one which includes a code that may be redeemed for value. For example, if a page's URL includes the word "code," then this may indicate that the page includes a code that may be redeemed for value. In yet another example, a code may be automatically identified by the software module and/or the executable file and/or the server based at least in part on information gathered by or from other users who have previously accessed a particular site. Any of numerous types of information may be gleaned from other users' previous visits to a site. For example, the presence of a code on a particular page, a code's location on a page, and/or other information may be captured and used to automatically identify a code.

In some embodiments, the software module and/or the executable file and/or the server may receive or query merchant web servers for promotions or other discount codes, and store the information in the database. For example, the web server may be associated with a loyalty or membership program, whereby the web server hosts data records associated with the user of the user device, such that the web server stores various promotional or discount codes that may be utilized by the user device for different merchants or websites. In this example, a user may have a payment card that provides discounts at various merchants, but each merchant requires that a different discount code be entered during the "checkout" of that online transaction. The user is required to visit the web server website to identify the appropriate discount code for a particular transaction. The system allows the software module and/or the executable file and/or the server to query the web server for each of the discount codes and store those codes in the database.

At step 206, when the user performs a web browsing activity on a browser of the user device, the software module and/or the executable file may monitor and/or track the user activity. In an embodiment, several techniques may be used by the software module and/or the executable file to monitor and/or track the web browsing activities of the user on the user device, such as by tracking browser cookies, IP addresses, and information embedded in the uniform resource locator (URL) address. In one example, user web browsing activity may be tracked by the software module and/or the executable file using IP address. In another example, user web browsing activity may be tracked by the software module and/or the executable file by storing user's web browser cookies. For instance, cookies may be saved as text strings on the user's local drive and may be sent to the server by the software module and/or the executable file for session tracking. In yet another example, a server may also track the web browsing activity of the user using information embedded in a URL string. This process may be implemented by appending a tracking or query string onto the URL string at the server prior to sending the URL string to a browser. When a web browser accesses the content using the URL embedded with tracking information, the web browser sends the URL string back to the server. By keeping track of the embedded information, the server may track user web browsing activities and then identify one or more attributes such as products or product category being searched on a webpage the user is accessing.

When a user is searching for a particular product and/or an item on a webpage (for instance, a first webpage) on a user device, the software module and/or the executable file may be able to infer that the user is searching for the product and/or the item on the first webpage, and convey the user search operation results to the server. The first webpage may have a first identifier. The first identifier may correspond to a uniform resource locator (URL) address of a first website/first webpage or a name of the first website/the first webpage. Also, when the user may be purchasing a product, then the software module and/or the executable file may parse the webpage to identify text fields such as pay and credit card on the first webpage, which may enable the software module and/or the executable file to infer that the user is carrying out a payment activity. In some embodiments, the software module and/or the executable file may also constantly track a mode of payment of the user in order to track the user web activity on browser application of the user device.

At step 208, for every webpage accessed on a browser of a user device, the server via a software module executing on the browser, may query a database using a uniform resource locator of the first webpage accessed on the browser to retrieve a pre-determined list of webpages while the browser is displaying each webpage (i.e., the software module executes this function in the background as the browser displays the webpage in foreground to a user). The pre-determined list of webpages may include uniform resource locators of one or more webpages associated with one or more pre-determined entities.

In some embodiments, a server via the software module executing on the browser, may obtain an identity of the user of the user device and an identification of a webpage (for example, the first webpage) using the uniform resource locator. For instance, the server may query a database to retrieve information related to a pre-determined list of webpages. The pre-determined list of webpages may include one or more identifiers of one or more webpages/websites associated with one or more pre-determined entities. The one or more pre-determined entities may correspond to one or more business merchants. The server may then match the first identifier of the first webpage with the one or more identifiers of the one or more webpages/websites associated with the one or more pre-determined entities. When the first identifier of the first webpage matches with at least one of the one or more identifiers of the one or more webpages/websites associated with the one or more pre-determined entities, then the server retrieves information from the database associated with the at least one identifier that matched with the first identifier. Using the information retrieved, the server may then determine the identification of the first webpage.

The software module and/or the executable file may obtain the identity of the user of the user device by using a stored profile, cookies, IP address, request for input of an identification, or other identification method. The software module and/or the executable file may obtain the identification of the webpage using a domain, URL, or other identification method.

At step 210, upon identification of the webpage (for instance, the first webpage), a software module and/or the executable file may then identify a string of characters displayed on the first webpage indicating a transaction on the first webpage. The string of characters may include a dollar sign, a pound sign, a currency sign, and one or more transaction words such as "cost", "total", "amount". The software module and/or the executable file can identify the string of characters associated to the first webpage by identifying the HTML code of the first webpage, using web scraping, or recognizing the URL of the first webpage as one that presents such a field. Upon determining the string of characters associated to the first webpage, the string of characters are transmitted to the server. The server may then query the database to retrieve a pre-determined list of string of characters. The server may the compare the pre-determined list of string of characters in the database with the identified string of characters on the first webpage At step 212, when the pre-determined list of string of characters in the database includes at least one identified string of characters on the first webpage, a server may then query the database to retrieve a user profile of a user operating the user device. The user profile may include one or more user membership attributes.

For example, the server upon determining that the pre-determined list of string of characters in the database include at least one identified string of characters on the first webpage, the server may then generate a query for a database with a request that contains the identification information of the user of the user device, membership information of the user of the user device, and the identification information of the webpage. The server may then receive a plurality of promotional offers associated with the one or more user membership attributes and the uniform resource locator of the first webpage. In some embodiments, the server may identify the promotional offers based at least in part on a tracked activity (for example, data associated to the webpage and/or the item being view by the user).

In some embodiments, the server may identify the promotional offers based on correlation of the personal details of the user, webpage being browsed by the user, and product/item selected for online shopping. The server may identify the promotional offers based on the tracked activity where the database stores various promotions, shopping details, and personal details of user. For example, user may have a given bank account debit/credit card, and at the payment page, if an offer related to the given bank may be available in the user profile, the server may identify such a promotion to transmit to the software module and/or the executable file for recommending to the user.

In some embodiments, the server may employ one or more techniques to identify the most relevant promotional offers for the user related to product/item being considered by the user during online shopping on the first webpage. In one example, the one or more techniques executed by the server may be on the basis of one or more rules defined by the merchants, banks, etc., for the promotions they are offering to the user. In another example, the one or more techniques executed by the server may be on the basis of one or more rules defined by the user. In yet another example, the server may identify the promotional offers based on one or more parameters associated with the personal details of the user. For instance, the one or more parameters may include, but not limited to, membership attributes and loyalty programs with which the user is associated.

Upon identification of the promotional offers by the server, a notification corresponding to a plurality of promotional offers associated with the information are presented on the first webpage, at step 214. For example, the plurality of promotional offers may be transmitted to the software module and/or the executable file, and is then displayed on a graphical component overlaying on the GUI of the user device of the user. In some embodiments, upon identification of the plurality of promotional offers by the server, the plurality of promotional offers may be ranked by the server and is then transmitted to the software module and/or the executable file and displayed on the graphical component. The server may rank the plurality of promotional offers based on at least discount being offered for the item and the one or more rules defined by the user. For example, the user may specify to receive promotions from a particular set of merchants, brands, banks, etc. The plurality of promotional offers associated with the item may then be displayed on the graphical component in a ranked order offering lowest price to be paid being discounted from a retail list price of the item.

In some embodiments, a software module and/or an executable file may present a message to be displayed on the user device via a browser to inform the user of an available promotional offers applicable for their interested product/item. The message may be in various forms, including but not limited to, an icon, a pop-up window, displayed text, or any other visually perceptible format. In some embodiments, the promotional offers displayed to the user may not be active at the present time but encompasses benefits that will become active in the future.

In some embodiments, a software module and/or the executable file may present the promotional offers to be displayed on at least one portion of a browser. In some embodiments, the software module and/or the executable file interacts with the browser to display the promotional offers to the user. The examples of the portion of the browser may include a tag, message panel, curtain, a drop-down list, a dialogue box, a tool bar, a sidebar, and any other available space on browser. Further, the promotional offers may be displayed in a pre-defined format. The examples of the pre-defined format may include tagging a search result, highlighting the promotion with a border, and indicating the promotion with an icon such as an arrow.

In some embodiments, if multiple available promotional offers are applicable to the user's product/item of interest, the software module and/or the executable file may facilitate the display the available promotional offers via the browser in an order corresponding to a ranking of the promotional offers. The promotional offers may be ranked by the software module and/or the executable file according to ratings, e.g., by displaying an available promotional offer having a higher rating before an available promotion having a lower rating. The rating may be based on rules set by the user and/or administrator of the system. In another embodiment, the promotional offers may be ranked by the server according to the ratings, e.g., by displaying an available promotional offer having a higher rating before an available promotional offer having a lower rating. In some embodiments, a promotional offer having any rating may be ranked higher than and be displayed before a promotional offer having no rating by the software module and/or the executable file. The promotional offer may also be ranked by the software module and/or the executable file and displayed via the browser according to a predetermined quantitative metric related to the promotions. For example, if a user is entitled to a particular promotional offer (e.g., 10% discount on a particular desired product) based on their affiliation with a business merchant, and a numerically superior benefit (e.g., 20% discount on the product) based on their affiliation with a another business merchant offering same product, the better promotion may be displayed first by the software module and/or the executable file. In some embodiments, the predetermined metric may pertain to an absolute amount, e.g., cash back amount such as $10 off a good or service rather than a relative (percentage) amount discounted.

The user may then interact with the graphical component to select at least promotional offer. The server may receive the selection response from the user device. The server may query a database to retrieve a code associated with the selected promotional offer. The promotion code may include a text string of one or more alphanumerical values. The server may then transmit the promotion code to the software module and/or the executable file. The software module and/or the executable file may then populate an appropriate input field on the first webpage with the code. In some embodiments, details of the code and instructions on how to process the code may be displayed on a browser application and/or a graphical component.

Figure 3:
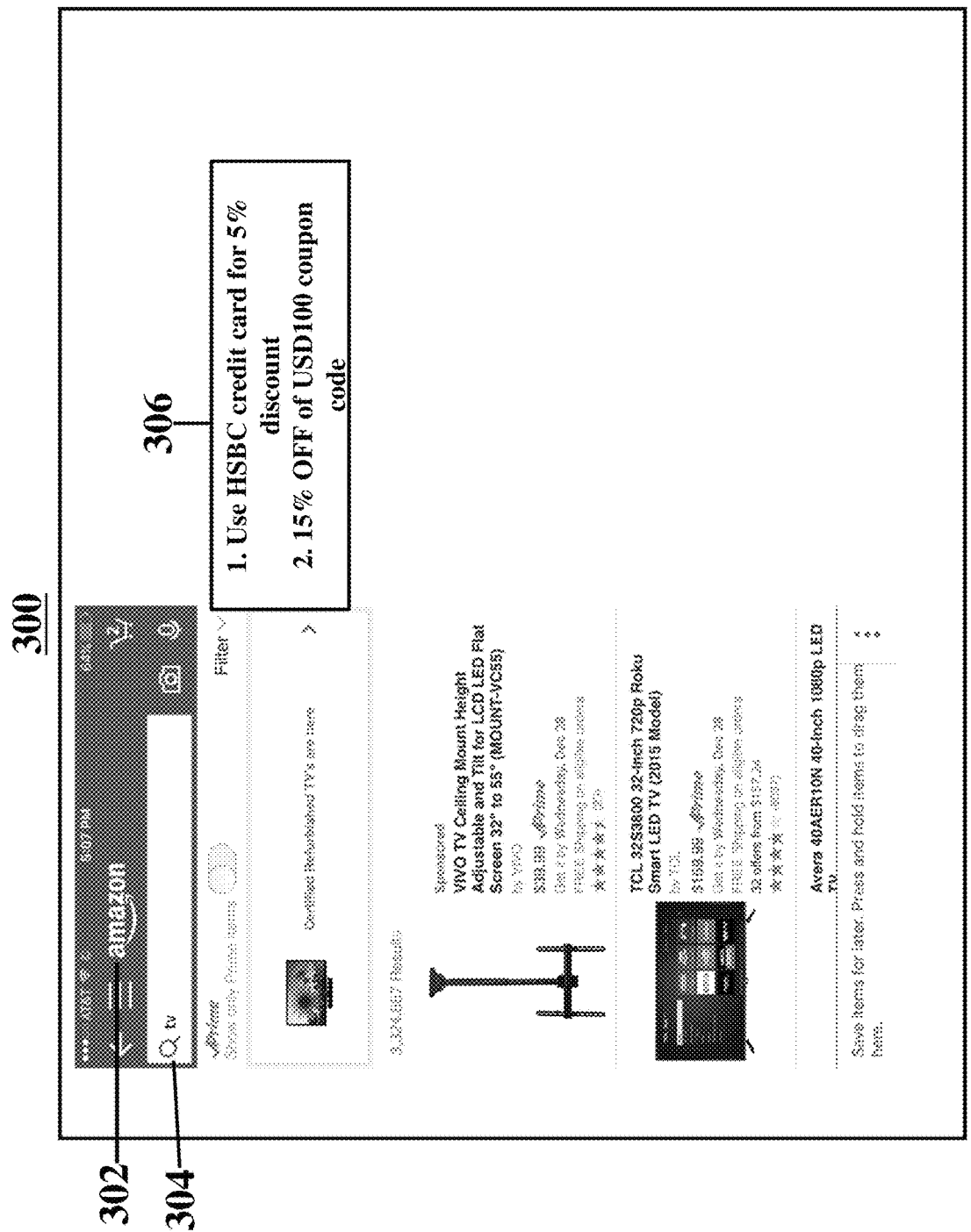
FIG. 3 illustrates a graphical user interface (GUI) for presenting a conversational view for assisting users select various promotional offers while shopping online, according to an exemplary embodiment.

FIG. 3 illustrates a graphical user interface (GUI) 300 for assisting users to select various promotional offers while shopping online, according to an exemplary embodiment. When a user browses a business merchant entity website 302 (for example, Amazon), a software module and/or an executable file on a browser may employ one of the several techniques to track user web activity. The techniques may include, but not limited to, tracking browser cookies, IP addresses, and information embedded in a uniform resource locator (URL) address. In this example, the software module and/or the executable file may track user web activity using information embedded in a URL string by the user (for example, www.amazon.com). Upon identification of the merchant entity website 302 being viewed by the user, the software module and/or the executable file may query a server, with identification of user and the merchant website 302. The server upon receiving the request from the software module and/or the executable file may then determine various promotional offers available to the user for the business merchant entity website 302 (for example, Amazon), and upon determination of the promotional offers available, the server may then transmit the various promotional offers to the software module and/or the executable file. The software module and/or the executable file may then display ranked order of the various promotional offers as a pop-up window 306 on the GUI 300. In some embodiments, when the user searches for a product 304 (for example, a television) on the business merchant entity website 302, the software module and/or the executable file may then present various ranked order of the promotional offers available to the user from various television companies and then display to the user such promotions in the pop-up window 306.

Figure 4:
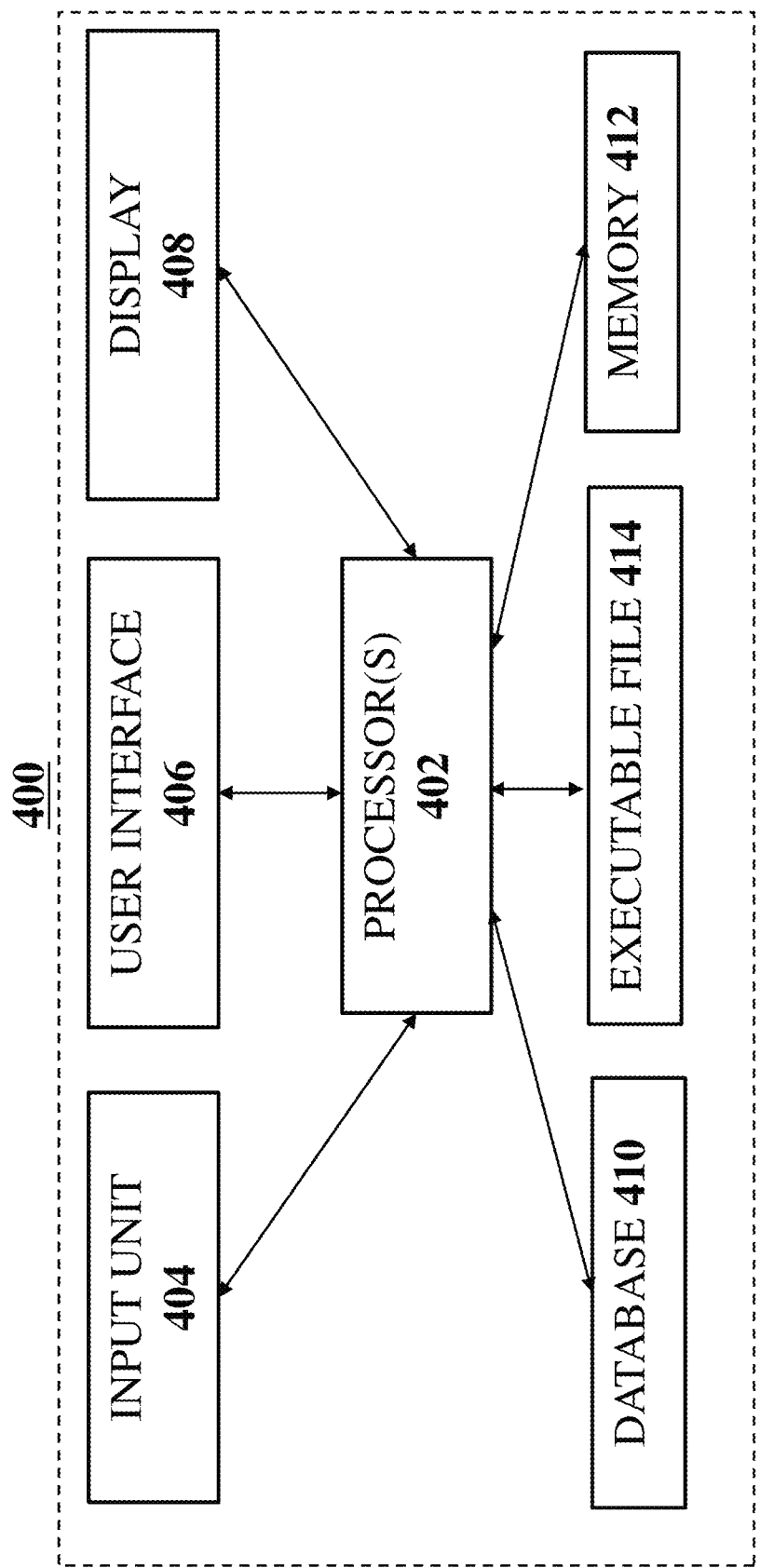
FIG. 4 is a block diagram showing components of an exemplary system for assisting users to select various promotional offers while shopping online, according to an exemplary embodiment.

FIG. 4 is a block diagram showing components of an exemplary system 400 for assisting users to select various promotional offers while shopping online, according to an exemplary embodiment. The exemplary system 400 may include one or more processors 402, an input unit 404, an user interface 404, a display 408, a database 410, a memory 412, and an executable file 414. In one implementation, all the components of system 400 may be connected via an interconnect bus. In another implementation, the one or more processors 402 may be connected to the memory 412 via a local microprocessor bus, and the remaining components of the system 400 may be connected via one or more input/output buses.

One or more processors 402 control the operations of the system 400. The one or more processors 402 may be an internal and/or external component of a user device and/or a server. In one embodiment, a single processor may be employed. In another embodiment, a plurality of processors 402 may be employed for configuring the system 400 as a multi-processor system. The processor 402 includes suitable logic, circuitry, and interfaces that are operable to execute one or more instructions to perform predetermined operations such as calculating a baseline and a sales life for the businesses. The processor 402 can be realized through a number of processor technologies known in the art. The examples of the processor include, but are not limited to, an x86 processor, an ARM processor, a Reduced Instruction Set Computing (RISC) processor, an Application-Specific Integrated Circuit (ASIC) processor, or a Complex Instruction Set Computing (CISC) processor. The processor 402 may also include a Graphics Processing Unit (GPU) that executes the set of instructions to perform one or more processing operations.

The system 400 may include a software module and/or a browser application having an executable file 414. The executable file 414 may be an extension, plug-in, or add-on. The browser application of the system 400 executes the executable file 414. The software module and/or the executable file 414 may be utilized to obtain the identification of the webpage using a domain, URL, or other identification method.

The input unit 404 may be a keyboard, mouse, pointer, or other input generating device to facilitate input of instructions by an user to the processor 402. In one embodiment, the input unit 404 provides a portion of the user interface 406 for the system 400, and may include an alphanumeric keypad for inputting alphanumeric and other key information along with a cursor control device such as a mouse, a trackpad or stylus. A display 408 of the system 400 may include a cathode ray tube (CRT) display, liquid crystal display (LCD), plasma, or light emitting diode (LED) display. In some examples, the display 408 provides some or all of the functionality of a user interface 404 of the user device. For instance, the display 408 can be a touch-sensitive and/or presence-sensitive display that can display a graphical user interface (GUI) and detect input from a user in the form of user input gestures. A graphics subsystem may receive textual and graphical information and process the information for output to the display 408.

The user interface 406 allows a user of the computing device to interact with computing device. Examples of the user interface 406 include, but are not limited to, a keypad embedded on computing device, a keyboard, a mouse, a roller ball, buttons, or other devices that allow a user to interact with computing device. In some examples, the computing device does not include the user interface 406, and the user interacts with computing device with the display 408 (e.g., by providing various user gestures). In some examples, the user interacts with computing device with the user interface 406 and the display 408.

The database 410 can be configured to store information within the computing device during operation. The database 410 in some examples, is described as a computer-readable storage medium. In some examples, the database 410 include a temporary memory, meaning that a primary purpose of the database 410 is not long-term storage. The database 410 in some examples, described as a volatile memory, meaning that the database 410 do not maintain stored contents when the computer is turned off. Examples of volatile memories include random access memories (RAM), dynamic random access memories (DRAM), static random access memories (SRAM), and other forms of volatile memories known in the art. In some examples, the database 410 is used to store program instructions for execution by the one or more processors 402. The database 410, for example, are used by software or applications running on user device to temporarily store information during program execution.

The database 410, in some examples, also include one or more computer-readable storage media. The database 410 can be configured to store larger amounts of information than volatile memory. The database 410 can further be configured for long-term storage of information. In some examples, the database 410 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

A memory 412 may also be provided in the system 400. The memory 412 may be a non-volatile storage device for storing data and instructions, to be used by the processor 402. The memory 412 may be implemented with a magnetic disk drive, an optical disk drive, a solid state device, or an attachment to a network storage. The memory 412 may comprise one or more memory devices to facilitate storage and manipulation of program code, set of instructions, tasks, data, PDKs, and the like. Non-limiting examples of memory implementations may include, but are not limited to, a random access memory (RAM), a read only memory (ROM), a hard disk drive (HDD), a secure digital (SD) card, a magneto-resistive read/write memory, an optical read/write memory, a cache memory, or a magnetic read/write memory. The memory may include one or more instructions that are executable by the processor 402 to perform specific operations.

Consistent with the above, the method includes identifying the information associated with the request, including the aforementioned at least one piece of client-specific business process data. The preceding description of the disclosed embodiments is provided to enable any person skilled in the art to make or use the present invention. Various modifications to these embodiments will be readily apparent to those skilled in the art, and the generic principles defined here may be applied to other embodiments without departing from the spirit or scope of the invention. Thus, the present invention is not intended to be limited to the embodiments shown here but is to be accorded the widest scope consistent with the following claims and the principles and novel features disclosed here. None of the features recited herein should be interpreted as invoking 35 U.S.C. § 112(f), unless the term "means" is explicitly used.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the principles of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

The previous description is of a preferred embodiment for implementing the invention, and the scope of the invention should not necessarily be limited by this description. The scope of the present invention is instead defined by the following claims.

What is claimed is:

1. A computer-implemented method comprising:
for every webpage accessed on a browser of a user device, querying, by a server via a software module executing on the browser as part of a background process, a database using a uniform resource locator of a first webpage accessed on the browser to retrieve a pre-determined list of webpages, the pre-determined list of webpages comprising uniform resource locators of one or more webpages associated with one or more pre-determined entities while the browser is displaying each webpage;
determining, by the server as part of the background process, that the pre-determined list of webpages in the database comprises the uniform resource locator of the first webpage;
responsive to determining that the pre-determined list of webpages in the database comprises the uniform resource locator of the first webpage, determining, by the server as part of the background process, that the first webpage indicates a transaction by parsing content of the first webpage to identify a string of characters displayed on the first webpage indicating the transaction, the transaction indicating a product selected by a user operating the user device for purchase;
responsive to determining that the first webpage indicates the transaction, querying, by the server as part of the background process, the database to retrieve a pre-determined list of string of characters;
determining, by the server as part of the background process, that the first webpage includes a field that accepts a promotional code for the transaction by determining that the pre-determined list of string of characters in the database comprises at least one identified string of characters on the first webpage;
responsive to determining that the first webpage includes the field that accepts the promotional code for the transaction, querying, by the server as part of the background process, the database to retrieve a user profile of the user operating the user device, the user profile comprising one or more user membership attributes;
querying, by the server as part of the background process, the database for a plurality of promotional codes associated with the one or more user membership attributes, the uniform resource locator of the first webpage, and the product selected by the user for purchase in the transaction;
ranking, by the server as part of the background process, the plurality of promotional offers codes in a ranking order of a benefit value being offered to the user, wherein the ranking order lists the plurality of promotional codes ordered based on a discount from a retail list price of the product selected for purchase in the transaction and based on a respective rating of each of the plurality of promotional codes; and
displaying, by the server via the software module executing on the browser in a pop-up window, a graphical component comprising the ranking order of the plurality of promotional codes based on the benefit value offered to the user, the graphical component overlaying the first webpage.

2. The computer-implemented method of claim 1, further comprising:
determining, by the server via the software module executing on the browser, a navigation to the first webpage associated to a pre-determined entity on the user device by the user, wherein the software module is configured to track one or more of browser cookies, IP addresses, and information embedded in the uniform resource locator on the user device.

3. The computer-implemented method of claim 1, further comprising:
displaying, by the server, an authentication prompt on the user device comprising a login field configured to receive login data from the user;
receiving, by the server, the login data inputted by the user on the user device; and
authenticating, by the server, the user of the user device based on verification of identification data of the user obtained using the login data of the user.

4. The computer-implemented method of claim 1, further comprising:
determining, by the server, the plurality of promotional codes based on a record that store promotional information being offered by the one or more pre-determined entities to the user and a profile information collected about the user in the database.

5. The computer-implemented method of claim 4, wherein the promotional information comprises referral URL and tracking codes, duration of applicability of the plurality of promotional codes, terms and conditions associated with the plurality of promotional codes, name of merchants, applicable membership levels, and descriptive text about the plurality of promotional codes.

6. The computer-implemented method of claim 1, wherein the plurality of promotional codes are displayed as a message on the user device, and wherein the message is displayed as at least one of an icon, displayed text, or any other visually perceptible format.

7. The computer-implemented method of claim 1, further comprising:
utilizing, by the server via the software module executing on the browser, web crawlers to crawl various websites associated with user membership clubs, banks, and merchants in order to retrieve the plurality of promotional codes available for the user.

8. The computer-implemented method of claim 1, further comprising:
automatically receiving, by the server, data feeds associated to codes and promotions from the one or more pre-determined entities.

9. The computer-implemented method of claim 1, further comprising:
scanning, by the server via the software module executing on the browser, every webpage being accessed by the user to identify one or more promotion codes.

10. The computer-implemented method of claim 1, further comprising searching, by the server via the software module executing on the browser, characteristics that indicate a signal of a presence of one or more codes on every webpage being accessed by the user.

11. A system comprising:
a user device comprising a browser, the browser comprising a software module, the software module in connection to a server and is configured to:
for every webpage accessed on the browser of the user device, query a database as part of a background process using a uniform resource locator of a first webpage accessed on the browser to retrieve a pre-determined list of webpages, the pre-determined list of webpages comprising uniform resource locators of one or more webpages associated with one or more pre-determined entities while the browser is displaying each webpage;
determine, as part of the background process, that the pre-determined list of webpages in the database comprises the uniform resource locator of the first webpage;
responsive to determining that the pre-determined list of webpages in the database comprises the uniform resource locator of the first webpage, determine, as part of the background process, that the first webpage indicates a transaction by parsing content of the first webpage to identify a string of characters displayed on the first webpage indicating the transaction, the transaction indicating a product selected by a user operating the user device for purchase;
responsive to determining that the first webpage indicates the transaction, query the database to retrieve a pre-determined list of string of characters as part of the background process;
determine, as part of the background process, that the first webpage includes a field that accepts a promotional code for the transaction by determining that the pre-determined list of string of characters in the database comprises at least one identified string of characters on the first webpage;
responsive to determining that the first webpage includes the field that accepts the promotional code for the transaction, query the database to retrieve a user profile of the user operating the user device, the user profile comprising one or more user membership attributes as part of the background process;
query, as part of the background process, the database for a plurality of promotional codes associated with the one or more user membership attributes, the uniform resource locator of the first webpage, and the product selected by the user for purchase in the transaction;

rank, as part of the background process, the plurality of promotional codes in a ranking order based on a benefit value being offered to the user, wherein the ranking order lists the plurality of promotional codes ordered based on a discount from a retail list price of the product selected for purchase in the transaction and based on a respective rating of each of the plurality of promotional codes; and display a graphical component as a pop-up comprising the ranking order of the plurality of promotional codes based on the benefit value offered to the user, the graphical component overlaying the first webpage.

12. The system of claim 11, wherein the server is further configured to:

determine a navigation to the first webpage associated to a pre-determined entity on the user device by the user, wherein the software module is configured to track one or more of browser cookies, IP addresses, and information embedded in the uniform resource locator on the user device.

13. The system of claim 11, wherein the server is further configured to:

display an authentication prompt on the user device comprising a login field configured to receive login data from the user;

receive the login data inputted by the user on the user device; and authenticate the user of the user device based on verification of identification data of the user obtained using the login data of the user.

14. The system of claim 11, wherein the server is further configured to:

determine the plurality of promotional codes based on a record that store promotional information being offered by the one or more pre-determined entities to the user and a profile information collected about the user in the database.

15. The system of claim 14, wherein the promotional information comprises referral URL and tracking codes, duration of applicability of the plurality of promotional codes, terms and conditions associated with the plurality of promotional codes, name of merchants, applicable membership levels, and descriptive text about the plurality of promotional codes.

16. The system of claim 11, wherein the plurality of promotional codes are displayed as a message on the user device, and wherein the message is displayed as at least one of an icon, displayed text, or any other visually perceptible format.

17. The system of claim 11, wherein the server is further configured to:

utilize one or more web crawlers to crawl various websites associated with user membership clubs, banks, and merchants in order to retrieve the plurality of promotional codes available for the user.

18. The system of claim 11, wherein the server is further configured to:

scan every webpage being accessed by the user to identify one or more promotion codes.

* * * * *